United States Patent
Manens et al.

(10) Patent No.: US 7,655,565 B2
(45) Date of Patent: Feb. 2, 2010

(54) ELECTROPROCESSING PROFILE CONTROL

(75) Inventors: Antoine P. Manens, Mountain View, CA (US); Vladimir Galburt, Campbell, CA (US); Yan Wang, Sunnyvale, CA (US); Alain Duboust, Sunnyvale, CA (US); Donald J. K. Olgado, Palo Alto, CA (US); Liang-Yuh Chen, Foster City, CA (US)

(73) Assignee: Applied Materials, Inc., Santa Clara, CA (US)

( * ) Notice: Subject to any disclaimer, the term of this patent is extended or adjusted under 35 U.S.C. 154(b) by 595 days.

(21) Appl. No.: 11/043,570

(22) Filed: Jan. 26, 2005

(65) Prior Publication Data

US 2006/0166500 A1 Jul. 27, 2006

(51) Int. Cl.
H01L 21/44 (2006.01)
H01L 21/302 (2006.01)
H01L 21/461 (2006.01)

(52) U.S. Cl. .............. 438/678; 438/692; 438/729; 438/714

(58) Field of Classification Search ........ 438/678, 438/692, 729, 714, 693
See application file for complete search history.

(56) References Cited

U.S. PATENT DOCUMENTS

| | | | |
|---|---|---|---|
| 3,162,588 A | 12/1964 | Bell | |
| 3,448,023 A | 6/1969 | Bell | |
| 3,873,512 A | 3/1975 | Latanision | |
| 4,119,515 A | 10/1978 | Costakis | |
| 4,125,444 A | 11/1978 | Inoue | |
| 4,713,149 A | 12/1987 | Hoshino | |
| 4,793,895 A | 12/1988 | Kaanta et al. | |
| 4,839,993 A | 6/1989 | Masuko et al. | |
| 4,934,102 A | 6/1990 | Leach et al. | |
| 4,954,141 A | 9/1990 | Takiyama et al. | |
| 4,956,056 A | 9/1990 | Zubatova et al. | |
| 5,096,550 A | 3/1992 | Mayer | |
| 5,136,817 A | 8/1992 | Tabata et al. | |
| 5,217,586 A | 6/1993 | Datta et al. | |
| 5,225,034 A | 7/1993 | Yu et al. | |
| 5,534,106 A | 7/1996 | Cote et al. | |
| 5,543,032 A | 8/1996 | Datta et al. | |

(Continued)

FOREIGN PATENT DOCUMENTS

EP 0 325 753 8/1989

(Continued)

OTHER PUBLICATIONS

Contolini "Electrochemical Planarization of ULSI Copper," *Solid State Technology*; vol. 40, No. 6, Jun. 1, 1997, pp. 155-156, 158, 160, 162.

(Continued)

*Primary Examiner*—Chuong A. Luu
(74) *Attorney, Agent, or Firm*—Patterson & Sheridan, LLP

(57) ABSTRACT

A method and apparatus for electroprocessing a substrate is provided. In one embodiment, a method for electroprocessing a substrate includes the steps of biasing a first electrode to establish a first electroprocessing zone between the electrode and the substrate, and biasing a second electrode disposed radially outward of substrate with a polarity opposite the bias applied tot he first electrode.

32 Claims, 10 Drawing Sheets

U.S. PATENT DOCUMENTS

| | | | |
|---|---|---|---|
| 5,567,300 A | 10/1996 | Datta et al. | |
| 5,575,706 A | 11/1996 | Tsai et al. | |
| 5,578,362 A | 11/1996 | Reinhardt et al. | |
| 5,624,300 A | 4/1997 | Kishii et al. | |
| 5,637,031 A | 6/1997 | Chen | |
| 5,674,758 A * | 10/1997 | McCarthy | 438/26 |
| 5,738,574 A | 4/1998 | Tolles et al. | |
| 5,766,446 A | 6/1998 | Spindt et al. | |
| 5,804,507 A | 9/1998 | Perlov et al. | |
| 5,807,165 A | 9/1998 | Uzoh et al. | |
| 5,846,882 A | 12/1998 | Birang | |
| 5,871,392 A | 2/1999 | Meikle et al. | |
| 5,893,796 A | 4/1999 | Birang et al. | |
| 5,911,619 A * | 6/1999 | Uzoh et al. | 451/5 |
| 5,931,719 A | 8/1999 | Nagahara et al. | |
| 5,938,801 A | 8/1999 | Robinson | |
| 5,966,151 A | 10/1999 | Wakahara | |
| 6,001,008 A | 12/1999 | Fujimori et al. | |
| 6,004,880 A | 12/1999 | Liu et al. | |
| 6,010,395 A | 1/2000 | Nakajima | |
| 6,017,265 A | 1/2000 | Cook et al. | |
| 6,020,264 A | 2/2000 | Lustig et al. | |
| 6,024,630 A | 2/2000 | Shendon et al. | |
| 6,051,116 A | 4/2000 | Ichinose et al. | |
| 6,056,851 A | 5/2000 | Hsieh et al. | |
| 6,066,030 A | 5/2000 | Uzoh | |
| 6,068,818 A | 5/2000 | Ackley et al. | |
| 6,090,239 A | 7/2000 | Liu et al. | |
| 6,103,096 A | 8/2000 | Datta et al. | |
| 6,116,998 A | 9/2000 | Damgaard et al. | |
| 6,141,027 A | 10/2000 | Akutsu et al. | |
| 6,153,043 A | 11/2000 | Edelstein et al. | |
| 6,156,124 A | 12/2000 | Tobin | |
| 6,159,079 A | 12/2000 | Zuniga et al. | |
| 6,171,467 B1 | 1/2001 | Weihs et al. | |
| 6,176,992 B1 | 1/2001 | Talieh | |
| 6,210,257 B1 | 4/2001 | Carlson | |
| 6,234,870 B1 | 5/2001 | Uzoh et al. | |
| 6,238,271 B1 | 5/2001 | Cesna | |
| 6,244,935 B1 | 6/2001 | Birang et al. | |
| 6,248,222 B1 | 6/2001 | Wang | |
| 6,273,798 B1 | 8/2001 | Berman | |
| 6,297,159 B1 | 10/2001 | Paton | |
| 6,328,872 B1 | 12/2001 | Talieh et al. | |
| 6,358,118 B1 | 3/2002 | Boehm et al. | |
| 6,368,184 B1 | 4/2002 | Beckage | |
| 6,368,190 B1 | 4/2002 | Easter et al. | |
| 6,379,223 B1 | 4/2002 | Sun et al. | |
| 6,381,169 B1 | 4/2002 | Bocian et al. | |
| 6,386,956 B1 | 5/2002 | Sato et al. | |
| 6,391,166 B1 | 5/2002 | Wang | |
| 6,395,152 B1 | 5/2002 | Wang | |
| 6,402,591 B1 | 6/2002 | Thornton | |
| 6,406,363 B1 | 6/2002 | Xu et al. | |
| 6,409,904 B1 | 6/2002 | Uzoh et al. | |
| 6,413,388 B1 | 7/2002 | Uzoh et al. | |
| 6,413,403 B1 | 7/2002 | Lindquist et al. | |
| 6,440,295 B1 | 8/2002 | Wang | |
| 6,447,668 B1 | 9/2002 | Wang | |
| 6,471,847 B2 | 10/2002 | Talieh et al. | |
| 6,482,307 B2 | 11/2002 | Ashjaee et al. | |
| 6,497,800 B1 | 12/2002 | Talieh et al. | |
| 6,582,281 B2 | 6/2003 | Doan et al. | |
| 6,612,904 B1 | 9/2003 | Boehm et al. | |
| 6,630,059 B1 | 10/2003 | Uzoh et al. | |
| 6,638,863 B2 | 10/2003 | Wang et al. | |
| 6,689,258 B1 | 2/2004 | Lansford et al. | |
| 6,726,823 B1 | 4/2004 | Wang et al. | |
| 6,776,693 B2 | 8/2004 | Duboust et al. | |
| 2001/0005667 A1 | 6/2001 | Tolles et al. | |
| 2001/0024878 A1 | 9/2001 | Nakamura | |
| 2001/0027018 A1 | 10/2001 | Molnar | |
| 2001/0036746 A1 | 11/2001 | Sato et al. | |
| 2001/0040100 A1 | 11/2001 | Wang | |
| 2001/0042690 A1 | 11/2001 | Talieh | |
| 2002/0008036 A1 | 1/2002 | Wang | |
| 2002/0011417 A1 | 1/2002 | Talieh et al. | |
| 2002/0020621 A1 | 2/2002 | Uzoh et al. | |
| 2002/0025760 A1 | 2/2002 | Lee et al. | |
| 2002/0025763 A1 | 2/2002 | Lee | |
| 2002/0070126 A1 | 6/2002 | Sato et al. | |
| 2002/0077037 A1 | 6/2002 | Tietz | |
| 2002/0088715 A1 | 7/2002 | Talieh et al. | |
| 2002/0108861 A1 | 8/2002 | Emesh | |
| 2002/0119286 A1 | 8/2002 | Chen et al. | |
| 2002/0130049 A1 | 9/2002 | Chen et al. | |
| 2003/0104762 A1 | 6/2003 | Sato et al. | |
| 2003/0114087 A1 | 6/2003 | Duboust et al. | |
| 2003/0116446 A1 | 6/2003 | Duboust et al. | |
| 2003/0213703 A1 | 11/2003 | Wang et al. | |
| 2003/0234184 A1 * | 12/2003 | Liu et al. | 205/680 |
| 2004/0023495 A1 * | 2/2004 | Butterfield et al. | 438/692 |
| 2004/0023610 A1 | 2/2004 | Hu et al. | |
| 2004/0121708 A1 | 6/2004 | Hu et al. | |
| 2004/0154931 A1 | 8/2004 | Hongo et al. | |
| 2006/0057812 A1 * | 3/2006 | Liu et al. | 438/330 |

FOREIGN PATENT DOCUMENTS

| | | |
|---|---|---|
| EP | 0 455 455 | 11/1991 |
| EP | 1 103 346 | 11/2000 |
| JP | 11042554 | 2/1999 |
| JP | 2001-77117 | 9/2002 |
| TW | 528649 | 4/2003 |
| TW | 536450 | 6/2003 |
| TW | 542768 | 7/2003 |
| TW | 200302150 | 8/2003 |
| WO | WO 98/49723 | 11/1998 |
| WO | WO 99/41434 | 8/1999 |
| WO | WO 99/53119 | 10/1999 |
| WO | WO 00/03426 | 1/2000 |
| WO | WO 00/024394 | 5/2000 |
| WO | WO 00/26443 | 5/2000 |
| WO | WO 00/33356 | 6/2000 |
| WO | WO 00/59682 | 10/2000 |
| WO | WO 01/49452 | 7/2001 |
| WO | WO 01/88229 | 11/2001 |
| WO | WO 02/23616 | 3/2002 |
| WO | WO 02/064314 | 8/2002 |
| WO | WO 03/001581 | 1/2003 |

OTHER PUBLICATIONS

D. Landoit, "Fundamental Aspects of Electropolishing", Mar. 18, 1996, pp. 1-11.

Nogami "*An Innovation to Integrate Porous Low-K Materials and Copper*", InterConnect Japan 2001; Honeywell Seminar (Dec. 6, 2001); pp. 1-12.

Partial International Search Report for US 02/40754 dated Apr. 28, 2003.

PCT International Preliminary Examination Report for PCT/US02/04806, dated Sep. 7, 2004.

PCT International Preliminary Examination Report for PCT/US03/06058, dated Sep. 7, 2004.

PCT International Search Report for PCT/US 02/11009 dated Feb. 6, 2003.

PCT International Search Report for PCT/US03/01760 dated May 27, 2003.

PCT International Search Report for PCT/US03/29230 dated Feb. 3, 2004.

PCT International Search Report for US 02/04806 dated Apr. 1, 2003.

PCT International Search Report for US 03/06058 dated Jun. 25, 2003.

PCT Written Opinion for PCT/US02/04806, dated Mar. 9, 2004.

PCT Written Opinion for PCT/US03/01760 dated Mar. 8, 2004.

PCT Written Opinion for PCT/US03/06058, dated Feb. 13, 2004.
PCT Invitation to Pay Additional Fees for PCT/USO4/006385 dated Mar. 22, 2005.
PCT International Search Report for PCT/US04/006385 dated May 17, 2005.
PCT Written Opinion for PCT/US04/006385 dated May 17, 2005.
PCT International Search Report and Written Opinion dated Jun. 30, 2006 for PCT/US2006/002595.

Notice of Allowance of Taiwan Application No. 95102669 dated Jun. 14, 2007.
Notice to File a Response dated Jan. 19, 2009 for Korean Patent Application No. 10-2007-7018157.
First Office Action for CN 200680002929.1, Aug. 1, 2008, consists of 6 pages.

* cited by examiner

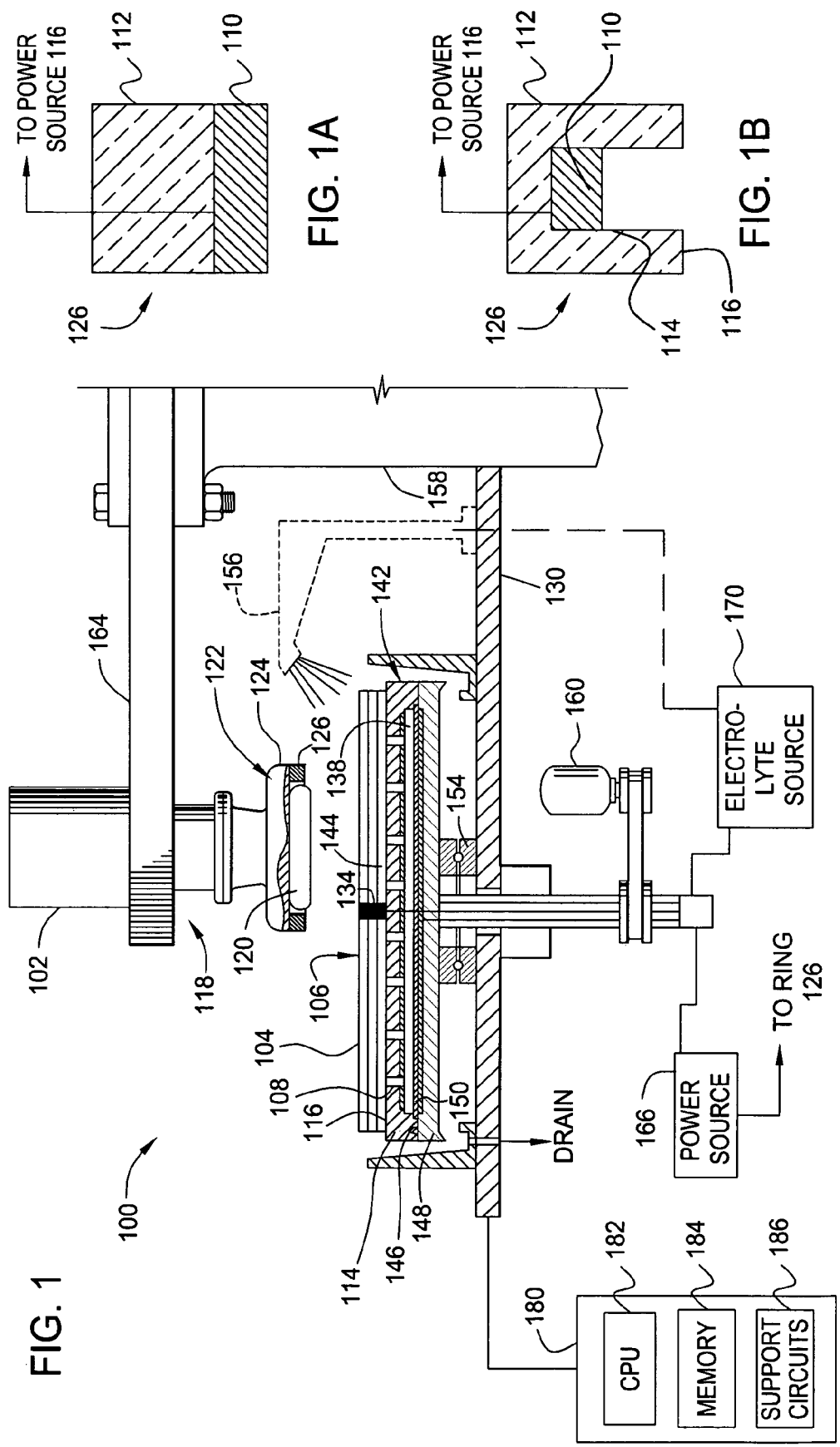

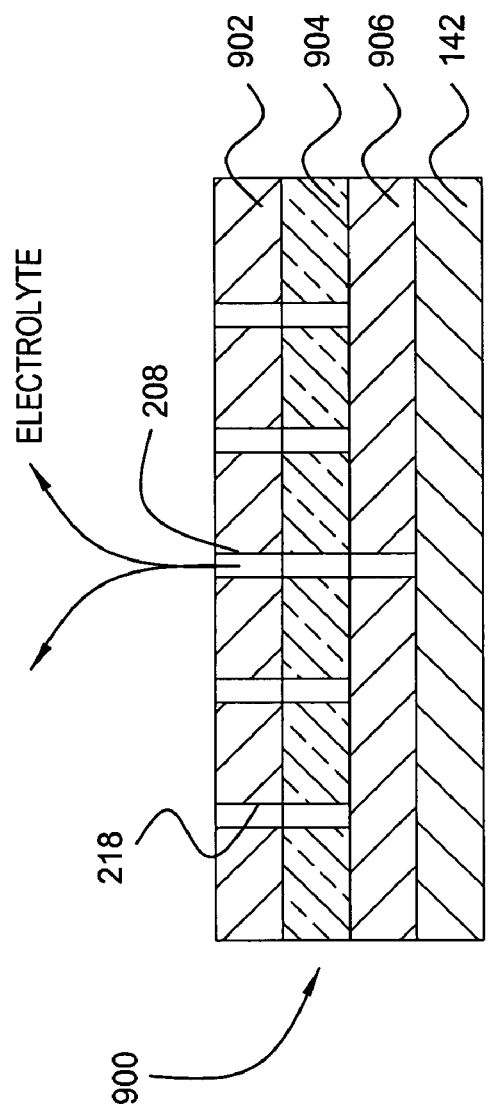
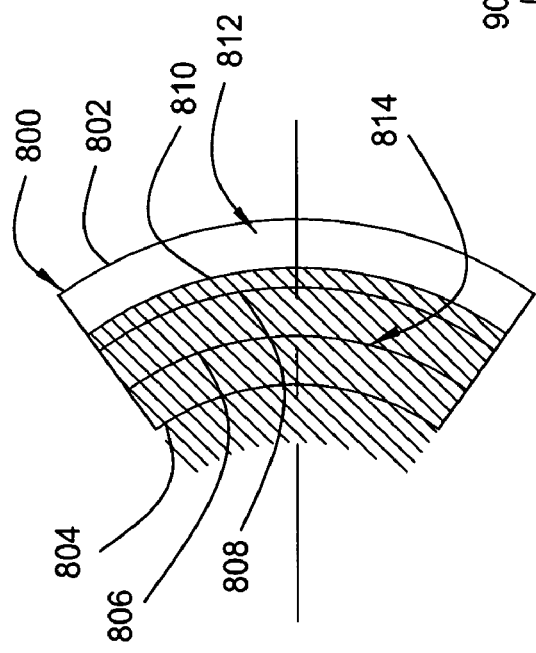
FIG. 9
FIG. 8

ELECTROPROCESSING PROFILE CONTROL

BACKGROUND OF THE INVENTION

1. Field of the Invention

Embodiments of the invention generally relate to profile control for electroprocessing substrates.

2. Description of the Related Art

Electrochemical Mechanical Polishing (Ecmp) is a technique used to remove conductive materials from a substrate surface by electrochemical dissolution while concurrently polishing the substrate with reduced mechanical abrasion as compared to conventional Chemical Mechanical Polishing (CMP) processes. Electrochemical dissolution is performed by applying a bias between a cathode and a substrate surface to remove conductive materials from the substrate surface into a surrounding electrolyte. The bias may be applied to the substrate surface by a conductive contact disposed on or through a polishing material upon which the substrate is processed. A mechanical component of the polishing process is performed by providing relative motion between the substrate and the polishing material that enhances the removal of the conductive material from the substrate.

Profile control in some electroprocessing apparatuses has been generally realized by creating a plurality of process cells or zones across the width of the substrate being processed. By controlling the electrical bias or current flow between the individual cells, the rate of removal or deposition of conductive material on the substrate may be controlled.

However, control of the processing rate at the edge of the substrate has presented a significant challenge. As the electric potential of the electrolyte adjacent to the substrate has a greater (more negative) potential relative to the electrolyte located between the substrate and the electrode that defines a process cell, the voltage gradient is high at the edge of the substrate. The high voltage gradient causes greater current densities, and thus faster processing, at the edge of the substrate. Fast edge processing is generally undesirable because of the resulting reduction in usable substrate area for device fabrication. Thus, it would be desirable to improve profile control of an electroprocess such that the area near the edge of the substrate would have material removal and deposition rates comparable to the center of the substrate.

Thus, there is a need for an improved method and apparatus for electroprocessing.

SUMMARY OF THE INVENTION

A method and apparatus for electroprocessing a substrate is provided. In one embodiment, a method for electroprocessing a substrate includes the steps of biasing a first electrode to establish a first electroprocessing zone between the electrode and the substrate, and biasing a second electrode disposed radially outward of substrate with a polarity opposite the bias applied to the first electrode. The opposite bias of the second electrode causes a transition voltage gradient to move outward, thereby improving control of electroprocessing at the edge of the substrate.

In another embodiment, a method of electroprocessing substrate includes the steps of contacting a substrate to a polishing surface and providing relative motion therebetween, establishing a conductive path through electrolyte between a plurality of electrodes and a substrate, biasing the substrate relative to the plurality of electrodes, and simultaneously biasing at least two of the plurality of electrodes with opposite polarities.

In yet another embodiment, an apparatus for electrochemically processing a substrate includes a processing layer, a polishing head and a plurality of electrodes. The processing layer includes a surface adapted for processing a substrate thereon. The polishing head is adapted for retaining a substrate against the processing surface. At least one drive mechanism is provided for proving relative motion between the processing layer and the polishing head. The drive mechanism provides a range of motion between the processing layer and the polishing head that at least partially defined a processing area on the processing surface. The plurality of electrodes are deposed below the processing layer, wherein at least a first electrode is disposed outward of the processing layer, at least a second electrode and a third electrode are disposed inward of the first electrode, and at least a fourth electrode is disposed inward of the second electrode and having a width greater than the second and third electrodes.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 1 is a side view, partially in cross-section, of one embodiment of an electrochemical mechanical polishing station;

FIGS. 1A-B are sectional views of alternate embodiments of a conductive retaining ring;

FIG. 8 is a partial plan view of a substrate illustrating how the method of FIG. 6 reduces edge exclusion growth during processing.

FIG. 9 depicts an alternative embodiment of a polishing pad assembly that may be utilized in an Ecmp station to practice the method of FIG. 6.

To facilitate understanding, identical reference numerals have been used, where possible, to designate identical elements that are common to the figures.

DETAILED DESCRIPTION

Figure 2A:
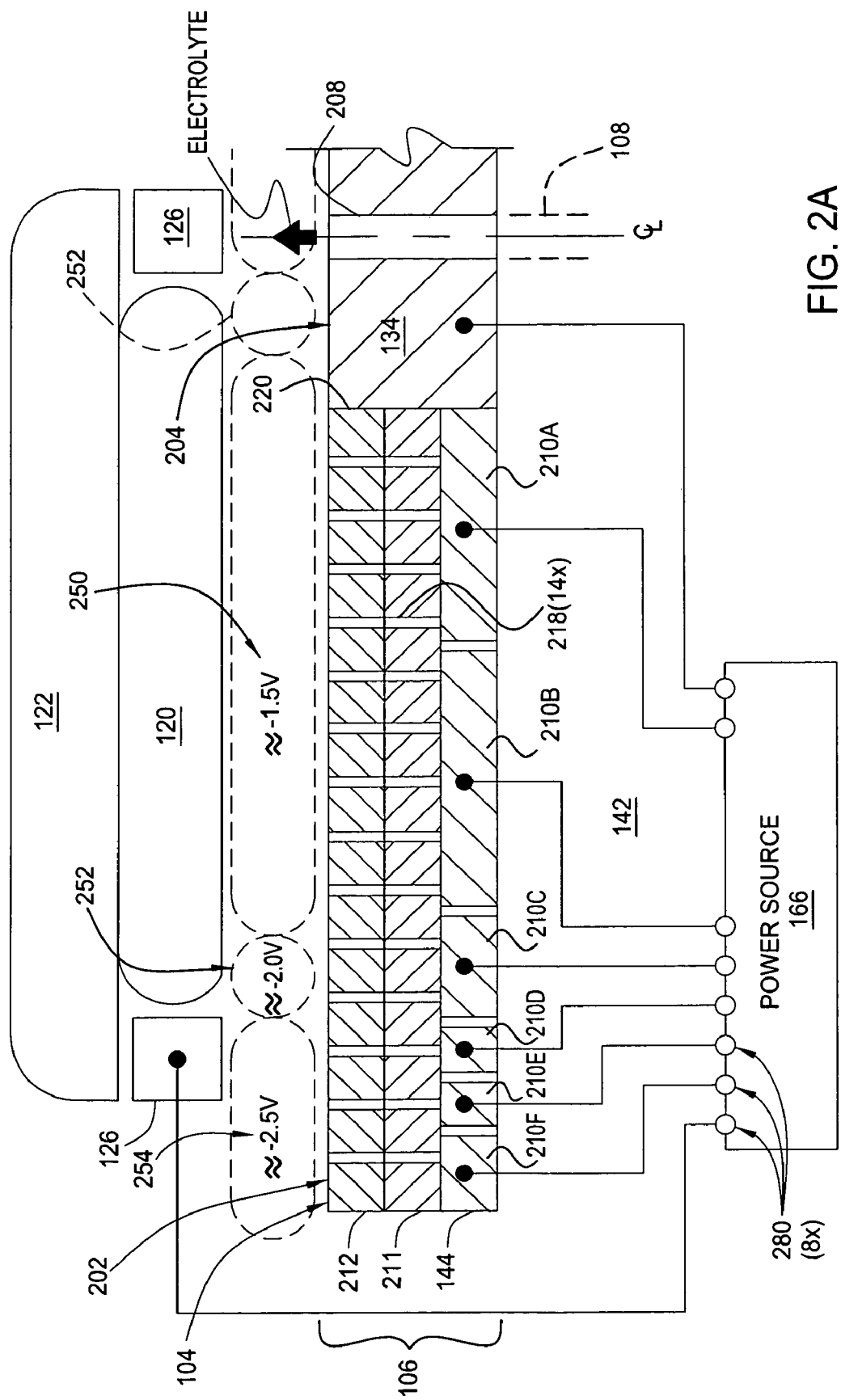
FIGS. 2A-B are partial sectional views of one embodiment of the polishing station of FIG. 1 in different modes of operation.

FIG. 1 depicts a sectional view of an Ecmp station 100 adapted to enhance uniform removal and/or deposition of material from a substrate. The Ecmp station 100 includes a polishing head assembly 118 adapted to hold a substrate 120 against a platen assembly 142. Relative motion is provided therebetween to polish the substrate 120. The relative motion may be rotational, lateral, or some combination thereof and may be provided by either or both of the polishing head assembly 118 and the platen assembly 142.

In one embodiment, the polishing head assembly 118 is supported by an arm 164 coupled by a support 158 to a base 130 and which extends over the Ecmp station 100. The Ecmp station 100 may be coupled to or disposed proximate the base 130.

The polishing head assembly 118 generally includes a drive system 102 coupled to a polishing head 122. The drive system 102 generally provides at least rotational motion to the polishing head 122. The polishing head 122 additionally may be actuated toward the platen assembly 142 such that the substrate 120 retained in the polishing head 122 may be disposed against a polishing surface 104 of the Ecmp station 100 during processing. The substrate retained in the polishing head 122 may be urged against the polishing surface 104 at pressures less than about 2 pounds per square inch (psi), and in another embodiment, at pressures less than about 1 psi.

In one embodiment, the polishing head 122 may be a TITAN HEAD™ or TITAN PROFILER™ wafer carrier manufactured by Applied Materials, Inc., of Santa Clara, Calif. Generally, the polishing head 122 comprises a housing 124 and a retaining ring 126 that define a center recess in which the substrate 120 is retained. The retaining ring 126 circumscribes the substrate 120 disposed within the polishing head 122 to prevent the substrate from slipping out from under the polishing head 122 during processing. It is contemplated that other polishing heads may be utilized.

The retaining ring 126 may be comprised of a conductive or dielectric material. The retaining ring 126 may be grounded, electrically biased or floating with respect to ground. In one embodiment, the retaining ring 126 is coupled to the power source 166. For example, as depicted in FIG. 1A, the retaining ring 126 may have a first portion 110 and a second portion 112. The first portion 110 is disposed on the bottom of the retaining ring 126 such that the first portion 110 faces the platen assembly 142. The first portion 110 is comprised of a conductive material and is coupled to the power source 166. The second portion 112 may be a dielectric material, conductive material or fabricated with the first portion as a one-piece member. In another embodiment depicted in FIG. 1B, the second portion 112 of the retaining ring 126 includes a recess 114 formed in the bottom surface 116. The first portion 110 is disposed in the recess 114 such that the bottom surface of the first portion is recessed from the bottom surface 116 such that the conductive material comprising the first portion 110 does not contact the polishing surface 104 during processing.

The platen assembly 142 is supported on the base 130 by a bearing 154 to facilitate rotation of the platen assembly 142 relative to the base 130. The platen assembly 142 is typically coupled to a motor 160 that provides the rotational motion to the platen assembly 142.

The platen assembly 142 has an upper plate 150 and a lower plate 148. The upper plate 150 may be fabricated from a rigid material, such as a metal or rigid plastic, and in one embodiment, is fabricated from or coated with a dielectric material, such as chlorinated polyvinyl chloride (CPVC). The upper plate 150 may have a circular, rectangular or other geometric form with a planar upper surface. A top surface 150 of the upper plate 150 supports a polishing pad assembly 106 that includes the polishing surface 104 thereon. The polishing pad assembly 106 may be held to the upper plate 150 of the platen assembly 142 by magnetic attraction, static attraction, vacuum, adhesives, or by clamping and the like.

The lower plate 148 is generally fabricated from a rigid material, such as aluminum and may be coupled to the upper plate 150 by any conventional means, such as a plurality of fasteners (not shown). The upper plate 150 and the lower plate 148 may optionally be fabricated from a single, unitary member.

A plenum 138 is defined in the platen assembly 142 and may be partially formed in at least one of the upper or lower plates 150, 148. At least one hole 108 is formed in the upper plate 150 to allow electrolyte, provided to the plenum 138 from an electrolyte source 170, to flow through the platen assembly 142 and into contact with the substrate 120 during processing. Alternatively, the electrolyte may be dispensed from an outlet 156 (shown in phantom) onto the polishing surface 104 of the polishing pad assembly 106.

One suitable electrolyte is described in U.S. patent application Ser. No. 10/845,754, filed May 14, 2004, which is hereby incorporated by reference in its entirety. In one embodiment, the electrolyte includes phosphoric acid, at least one chelating agent, a corrosion inhibitor, a salt, an oxidizer, abrasive particulates, at least one pH adjusting agent to provide a pH from about 4 to about 7, and a solvent. The solvent may be a polar solvent, such as deionized water or an organic solvent. Chelating agents are selected to complex with the surface of the substrate to enhance the electrochemical dissolution process. The chelating agents generally bind to a conductive material, such as copper ions and the like. The corrosion inhibitors are selected to reduce the oxidation or corrosion of metal surfaces by forming a passivation layer that minimizes the chemical interaction between the substrate surface and the surrounding electrolyte. Examples of salts that may be utilized include ammonium citrate and copper citrate. It is contemplated that other suitable electrolytes may be alternatively utilized.

At least one contact element 134 is disposed on the platen assembly 142, along with the polishing pad assembly 106, and is adapted to electrically couple the substrate 120 to the power source 166. Alternatively, the retaining ring 126 and contact element 134 may be powered by separate power sources. It is also contemplated that the substrate may be biased through the polishing head 122 or other device.

The contact element 134 may be coupled to the platen assembly 142, part of the polishing pad assembly 106 or a separate element and is generally positioned to maintain contact with the substrate during processing. An electrode 144 of the polishing pad assembly 106 is coupled to a different terminal of the power source 166 such that an electrical potential may be established between the substrate 120 and electrode 144 of the polishing pad assembly 106. In other words, during processing, when the substrate 120 is held against the polishing pad assembly 106, the contact element 134 biases the substrate 120 by electrically coupling the substrate 120 to one terminal of the power source 166. The electrode 144 of the polishing pad assembly 106 is coupled to another terminal of the power source 166. The electrolyte, which is introduced from the electrolyte source 170 and is disposed on the polishing pad assembly 106, completes an electrical circuit between the substrate 120 and the polishing pad assembly 106 (electrical circuit is completed between substrate and the electrode 144), which assists in the removal of material from the surface of the substrate 120. Alternatively, the pad assembly 106 may be configured without an electrode and solely use the contact element 134 to bias the substrate (in this case an electrode 114 that is disposed on or is part of the platen assembly 142 is utilized).

Figure 2B:
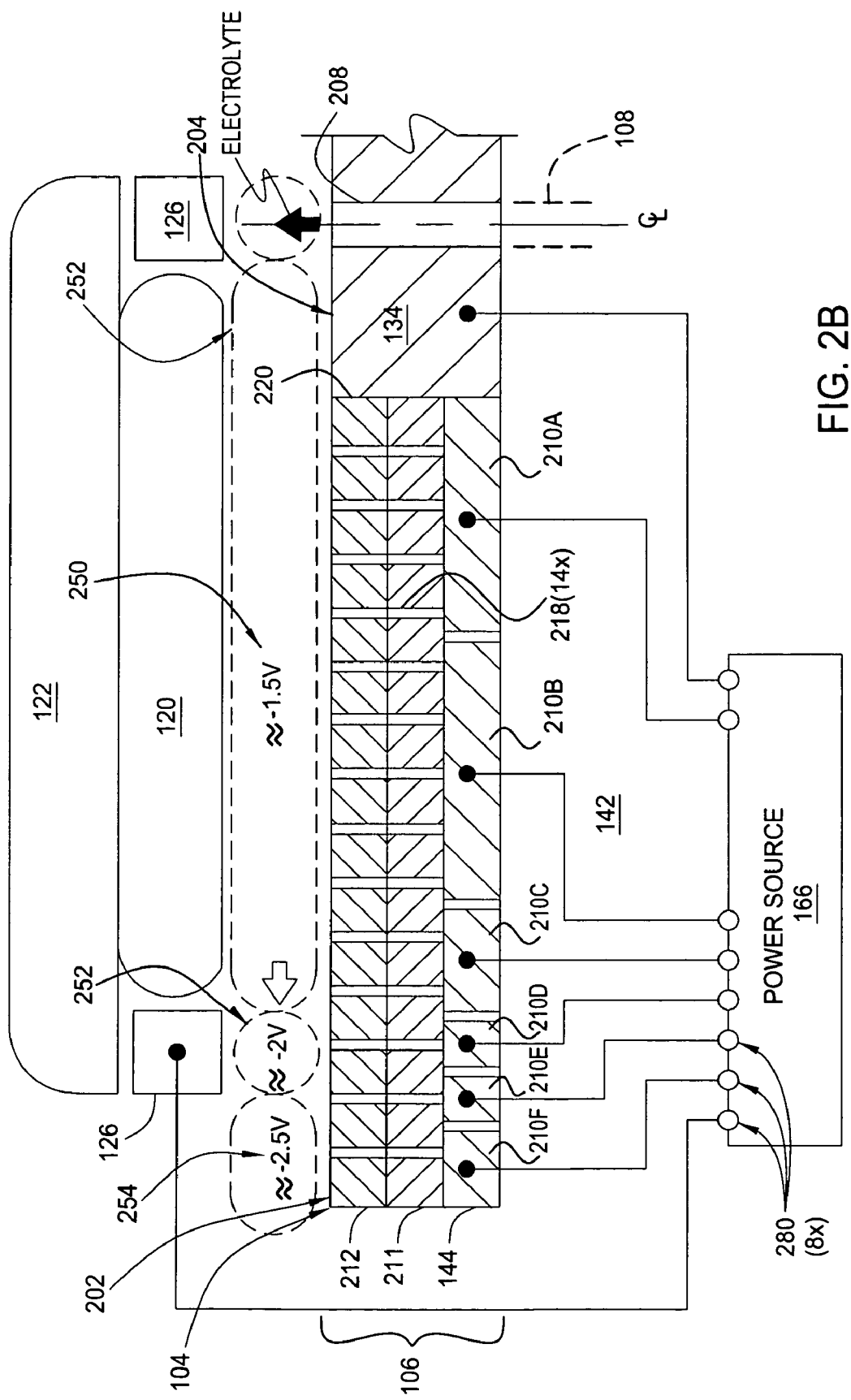

FIGS. 2A-B depicts a partial sectional view of the polishing pad assembly 106, at least one contact element 134, and platen assembly 142 of FIG. 1 in different modes of operation. The substrate 120 and retaining ring 126 are shown spaced from the pad assembly 106 to enable a description of voltage gradients in the electrolyte disposed on the pad assembly 106 and between the substrate 120 and polishing surface 104 as described further below. During processing, the substrate 120 is in contact with the polishing surface 104. Examples of polishing pad assemblies that may be adapted to benefit from the invention are described in U.S. patent application Ser. No. 10/455,941, filed Jun. 6, 2003, U.S. patent application Ser. No. 10/455,895, filed Jun. 6, 2003, U.S. patent application Ser. No. 10/642,128, filed Aug. 15, 2003, U.S. patent application Ser. No. 10/727,724, filed Dec. 3, 2003, and U.S. patent application Ser. No. 10/980,888, filed Nov. 3, 2004, all of which are hereby incorporated by reference in their entireties.

The polishing pad assembly 106 includes at least an upper layer 212 coupled to the electrode 144. In the embodiment depicted in FIG. 2, an optional subpad 211 is disposed between the electrode 144 and upper layer 212. The electrode 144, subpad 211, and upper layer 212 of the polishing pad assembly 106 may be combined into a unitary assembly by the use of adhesives, bonding, compression molding, or the like. As discussed above, the contact element 134 may be an integral part of the pad assembly 106, or removably coupled thereto.

The upper layer 212 defines a portion of the polishing surface 104 and includes at least one permeable passage 218. The polishing surface 104 of the upper layer 212 includes a non-conductive main polishing surface 202. In the embodiment depicted in FIG. 2, the polishing surface 104 includes a conductive surface 204 that is defined by the upper surface of the contact element 134.

The non-conductive surface 202 is comprised of a dielectric material. The non-conductive surface 202 may be fabricated from polymeric materials compatible with process chemistry, examples of which include polyurethane, polycarbonate, fluoropolymers, PTFE, PTFA, polyphenylene sulfide (PPS), or combinations thereof, and other polishing materials used in polishing substrate surfaces. In one embodiment, the non-conductive surface 202 of the polishing pad assembly 106 is dielectric, for example, polyurethane or other polymer. The non-conductive surface 202 additionally includes embedded abrasive particles and may also be textured, such as by embossing or by other techniques that provides a desired surface topography.

The passage 218 extends through the non-conductive surface 202, at least to the electrode 144, and allows an electrolyte to establish a conductive path between the substrate 120 and the electrode 144—i.e., the permeable passage 218 is disposed in any intervening layers such as, for example, the subpad 211. The passage 218 may be a permeable portion of the non-conductive surface 202, holes formed in the non-conductive surface 202, or a combination of the two.

The subpad 211, when present, may also be formed of a permeable material or include holes which align with the holes formed in the non-conductive surface 202. The subpad 211 is typically made of a material softer, or more compliant, than the material of the non-conductive surface 202. For example, the subpad can be closed-cell foam, such as polyurethane or polysilicone with voids, so that under pressure the cells collapse and the subpad compresses. In one embodiment, the subpad 211 comprises foamed urethane. Alternatively, the subpad 211 may be formed of other materials having other structures such as a mesh, cells, or solid configurations so long as the compressibility of the subpad 211 meets the requirements detailed below. Examples of suitable subpad 211 materials include, but are not limited to, foamed polymers, elastomers, felt, impregnated felt, and plastics compatible with the polishing chemistries.

It is permissible for the material of the subpad 211 to be laterally displaced under pressure from the substrate. The subpad 211 can have a hardness in the range of from 2-90 on the Shore A scale. In one embodiment, the subpad 211 has a Shore A hardness in the range of from about 20 or less, such as 12 or less, or 5 or less. In addition, the subpad 211 has a thickness of, e.g., 30 mils or more. In one embodiment, the subpad 211 has a thickness of 90 mils or more. For example, the subpad may be about 95 to 500 mils thick, such as 95 to 200 mils, or 95 to 150 mils, or 95 to 125 mils.

In general, the thickness of the subpad 211 is selected to ensure that, given the compressibility of the subpad 211 and the rigidity of the upper layer 212, the upper layer will deflect at very low pressures, e.g., pressures of 0.5 psi or less, an amount at least equal to any non-uniformity in the thickness of the upper layer, e.g., about 2 mil. Compressibility may be measured as a percentage thickness change at a given pressure. For example, under a pressure of about 0.5 psi, the subpad 211 can undergo about 3% compression. In another example, a 100 mil thick subpad should have a compression of at least 2% at 0.5 psi, whereas a 200 mil thick subpad should have a compression of at least 1% at 0.5 psi. A suitable material for the subpad is PORON 4701-30 from Rogers Corporation, in Rogers, Conn. (PORON is a trademark of Rogers Corporation). One example of a subpad that may be adapted to benefit from the invention is described in the previously incorporated U.S. patent application Ser. No. 10/642,128.

The contact element 134 is generally configured to electrically contact the substrate 120 without damage to the substrate 120 as the substrate moves across the contact element during processing. In one embodiment, the contact element 134 has a circular shape with a diameter ranging from 2 to 16 inches. The contact element 134 may be perforated to allow electrolyte flow. Alternatively, the contact element 134 may be configured as one or more rolling electrical elements, such as described in the aforementioned U.S. patent applications previously incorporated by reference above.

In another embodiment, the contact element 134 may be a conductive roller, for example, a polymer ball coated with at least one of nickel, tin or gold. In another embodiment, the contact element 134 includes conductive particles disposed in a polymer matrix. The mixture of tin particles and polymer matrix may be disposed over a dielectric fabric coated with metal such as copper, tin or gold etc. Optionally the conductive surface 204 may be flat, embossed or textured. In the embodiments depicted in FIGS. 2A-B, the contact element 134 is placed concentric to the centerline of the polishing pad assembly 106.

At least one aperture 220 is formed in at least the upper layer 212 and the optional subpad 211 of the polishing pad assembly 106 and may extend through the electrode 144 (as shown) to accommodate a respective contact element 134. In one embodiment, one aperture 220 formed in the center of the electrode 144, subpad 211 and the upper layer 212 to accommodate a single contact element 134. In alternative embodiments, a plurality of apertures 220 may be formed through the pad assembly 106 to accommodate a plurality of contact elements 134.

Figure 3A:
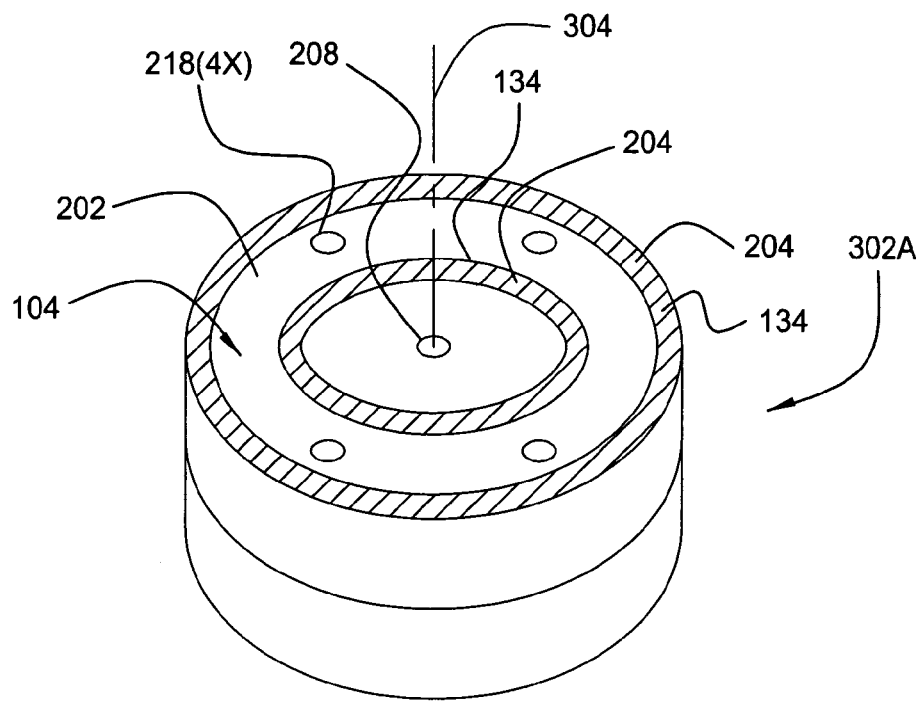
FIG. 3A-D are isometric views of different embodiments of an electrode of a polishing pad assembly.
Figure 3B:
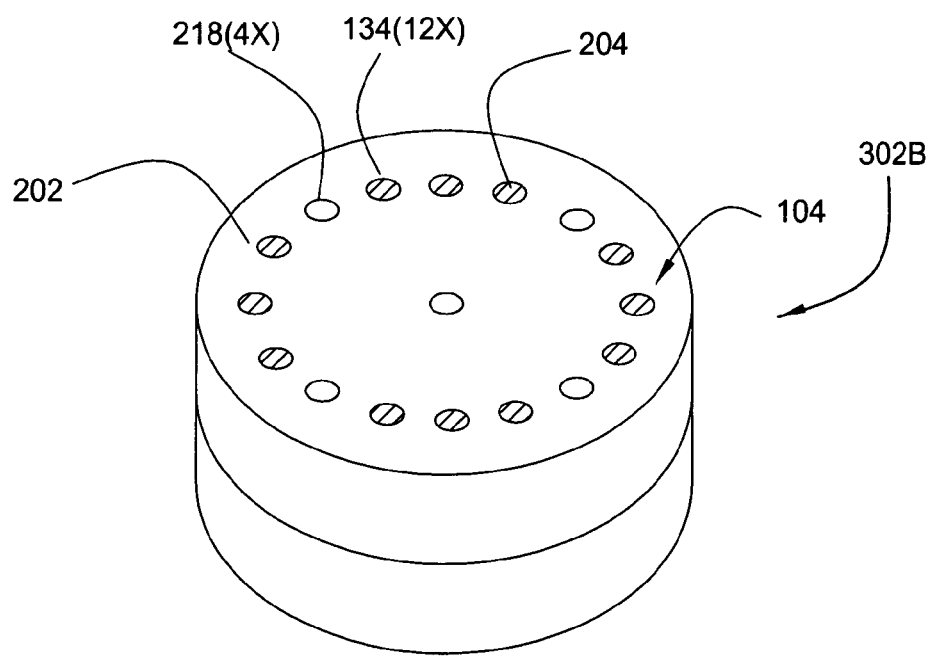
Figure 3C:
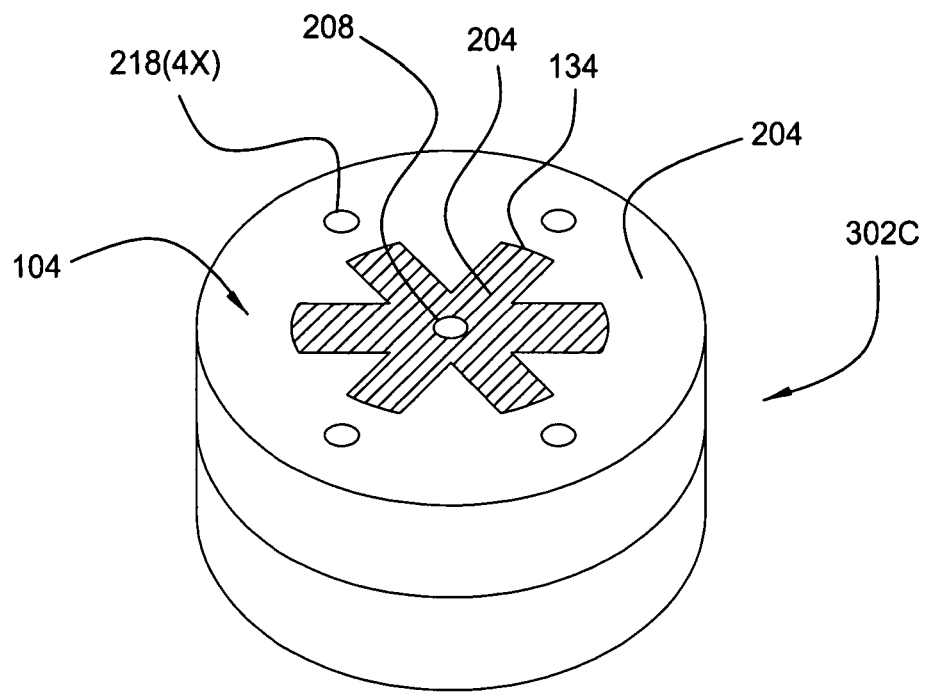
Figure 3D:
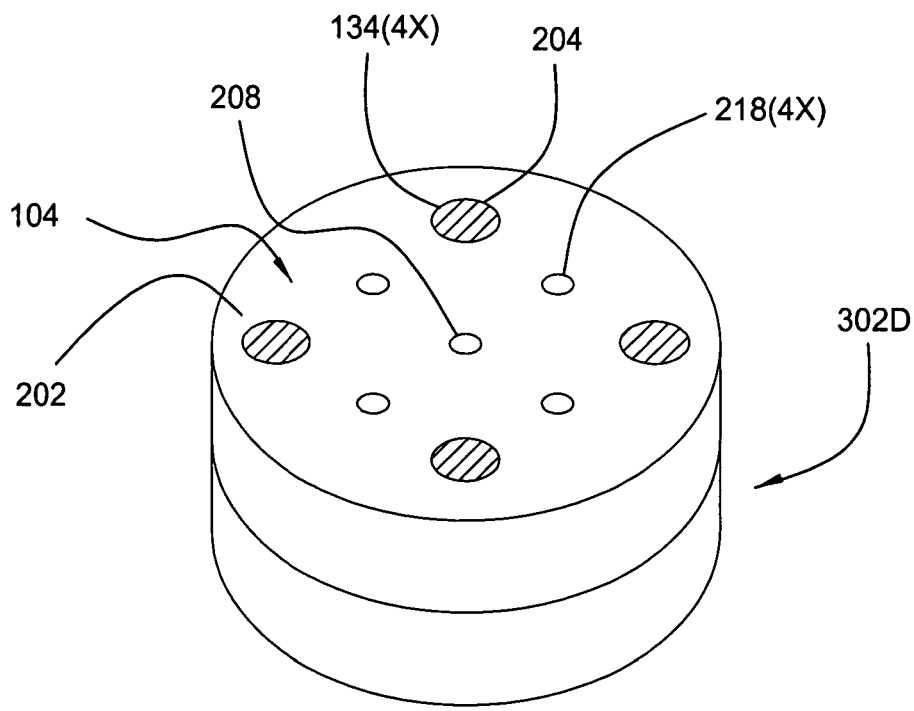

For example, FIGS. 3A-D depicts polishing pad assemblies 302A-D similar to the assembly 106 described above, and having one or more conductive elements 134 in various configurations. In the embodiment of FIG. 3A, at least one conductive element 134 (two are shown) are disposed concentric to an axis of rotation 304 of a pad assembly 302A. In the embodiment of FIG. 3B, a pad assembly 302B includes a plurality of conductive elements 134 disposed in a polar array. In the embodiment of FIG. 3C, a pad assembly 302C includes a contact element 134 having radial portions 306. In the embodiment of FIG. 3D, a pad assembly 302D includes a grid composed of one or more contact elements 134. It is contemplated that any number of contact elements 134 may be utilized in any geometric configuration across the polishing pad assemblies 106, 302A-D.

Returning to FIGS. 2A-B, at least one permeable passage 208 is disposed through the pad assembly 106 in fluid communication with the electrolyte source 170 through holes 108 of the platen assembly 142. The permeable passage 208 may be a permeable portion of the contact element 134, holes formed in the contact element 134, or a combination of the two. Alternatively, the passage 208 may be formed through the non-conductive surface 202. In the embodiment depicted in FIGS. 2A-B, the permeable passage 208 is formed through the center of the contact element 134 to allow electrolyte to flow therethrough and onto the polishing surface 104 during processing. Alternatively, a plurality of holes for electrolyte delivery may be formed in other portions of the pad assembly 106, such as through the non-conductive surface 202.

The electrode 144 is disposed on the top surface 116 of the platen assembly 142 and may be held there by magnetic attraction, static attraction, vacuum, adhesives, or the like. In one embodiment, adhesive is used to secure the electrode 144 to the upper plate 114. It is contemplated that other layers, such as release films, liners, and other adhesive layers, may be disposed between the electrode 144 and the upper plate 114 to facilitate ease of handling, insertion, removal and replacement of the polishing pad assembly 106 in the Ecmp station 100.

The electrode 144 is typically comprised of a corrosion resistant conductive material, such as metals, conductive alloys, metal coated fabrics, conductive polymers, conductive pads, and the like. Conductive metals include Sn, Ni, Cu, Au, and the like. Conductive metals also include a corrosion resistant metal such as Sn, Ni, or Au coated over an active metal such as Cu, Zn, Al, and the like. Conductive alloys include inorganic alloys and metal alloys such as bronze, brass, stainless steel, or palladium-tin alloys, among others.

The electrode 144 is coupled to the power source 166 and may act as a single electrode, or may comprise multiple independent electrode zones isolated from each other. In one embodiment, the electrode 144 is comprised of a plurality of independently biasable electrode segments. In the embodiment depicted in FIGS. 2A-B, six electrode concentric segments 210A-F are shown, although any number or geometric configuration of electrode segments may be utilized. As the electrode segments 210A-F are individually coupled to the power source 166, the power source 166 includes a plurality of output terminals 280 for independently controlling the bias to each electrode segment 210A-F, the contact element(s) 134 and, optionally, the retaining ring 126. By controlling the electrical bias applied between each electrode segment 210A-F and substrate (which is biased by the contact element 134), a plurality of independently controllable processing zones are established through the electrolyte across the diameter of the substrate 120, thereby facilitating profile control of the conductive material being removed from the substrate.

The power source 166 is capable of selectively applying either a positive or negative bias to the electrode segments 210A-F. In one embodiment, the power source may controllably apply power in the range of between about minus (−) 10 to about positive (+) 10 VDC to the electrode segments 210A-F.

Figure 4:
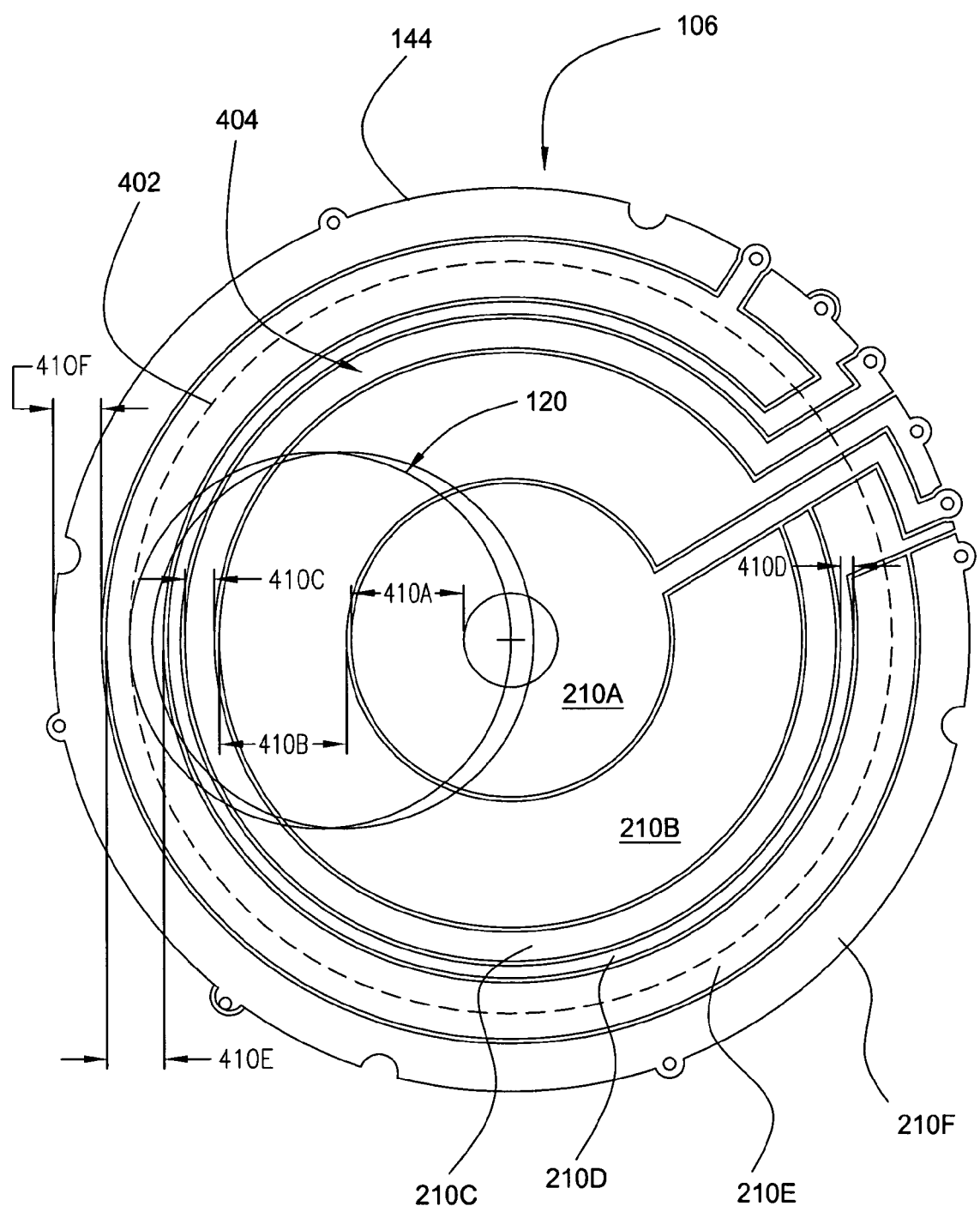
FIG. 4 is a bottom view of one embodiment of an electrode of a polishing pad assembly having a substrate superimposed thereon.

FIG. 4 depicts a bottom view of the electrode 144 of the pad assembly 106 having the substrate 120 superimposed in thereon. In practice, the substrate 120 is positioned on the opposite side of the pad assembly 106 than the electrode 144. In one embodiment, the inner electrode segments 210A-B of the electrode 144 respectively have larger widths 402A-B than the outer electrode segments 210C-F. The inner electrode segments 210A-B may underlie more than one half a processing area 404 of the pad assembly 106 defined inward of a dashed line 402 tangent to the out edge of the substrate 120 shown superimposed on the electrode 144 in its radially outermost polishing position. The electrode segments 210C-E, over which the edge of the substrate 120 spends the greatest amount of time during processing, generally have the shorter widths 410C-E, and in one embodiment, the electrode segment 210D has a width shorter than the adjacent electrodes 210C, 210E. In the embodiment depicted in FIG. 4, at least one of the outer electrode segments is disposed outward of the line 402 bounding the processing area 404, as illustrated in the embodiment of FIG. 4 by electrode segment 210F.

Figure 5:
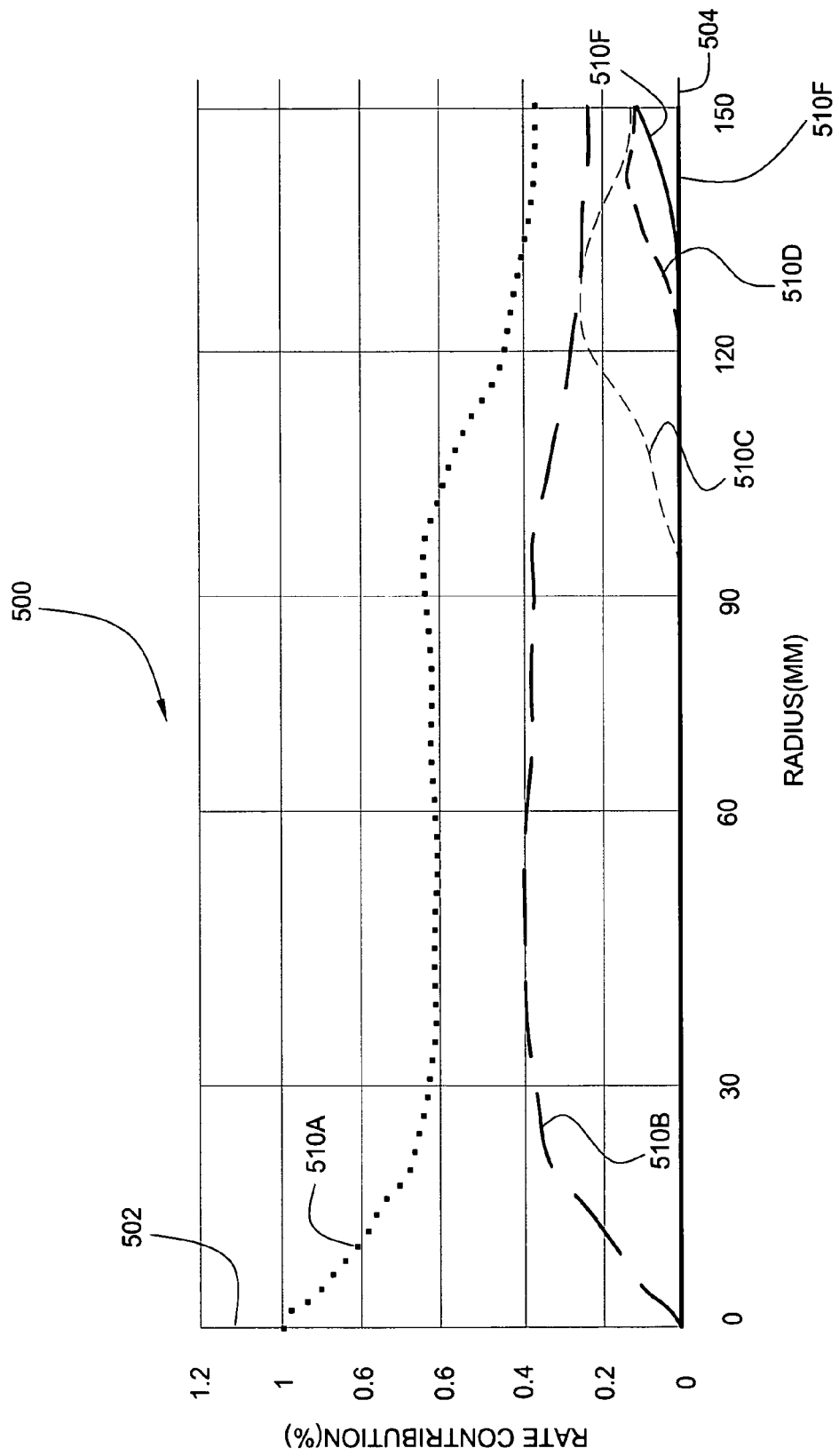
FIG. 5 is a graph depicting percent contribution of each segment of the electrode of FIG. 4 to conductive material removed from a substrate at different positions across the radius of the substrate.

FIG. 5 depicts a graph 500 illustrating plots 510A-F of percent contribution to polishing rate verses radial substrate position for each electrode segment 210A-F when equally biased during substrate processing. Percent contribution to polishing rate is plotted on the on y-axis 502, while radial position on the substrate is plotted on x-axis 504. As shown in FIG. 5, the inner electrode segments 210A-B have a greater contribution to material removal at the inner regions of the substrate 120 as compared to the outer electrode segments 210C-F. The contribution of the inner electrode segments 210A-B to the local polishing rate diminishes approaching the substrates perimeter, while the contribution to material removal at the perimeter of the substrate increases for the outer electrode segments 210C-E. As the outermost electrode segment 210F is disposed outward of the processing area 404, power to the electrode segment 210F has little contribution towards polishing rate. Thus from the graph 500, it is shown that the polishing rate profile can be tuned utilizing electrode segments predominately disposed inward of the edge of the substrate without having large effect on the polishing rate at the edge of the substrate. Thus, by having a greater number of electrode segments proximate the edge of the substrate, and by configuring the outer electrode segments with narrow widths, edge profile control may be decoupled from profile control of the center of the substrate resulting in improved substrate processing control and uniformity.

Moreover, it has been discovered that by reversing the polarity of selected electrode segments disposed outward of the processing area 404, such as electrode segment 210F, and/or by applying a positive bias to the retaining ring 126, a voltage gradient between the substrate and polishing surface 104 may be moved and/or maintained outward of the substrates perimeter. Control over the position of the voltage gradient allows the rate of polishing at the perimeter of the substrate to be more readily controlled.

Figure 6:
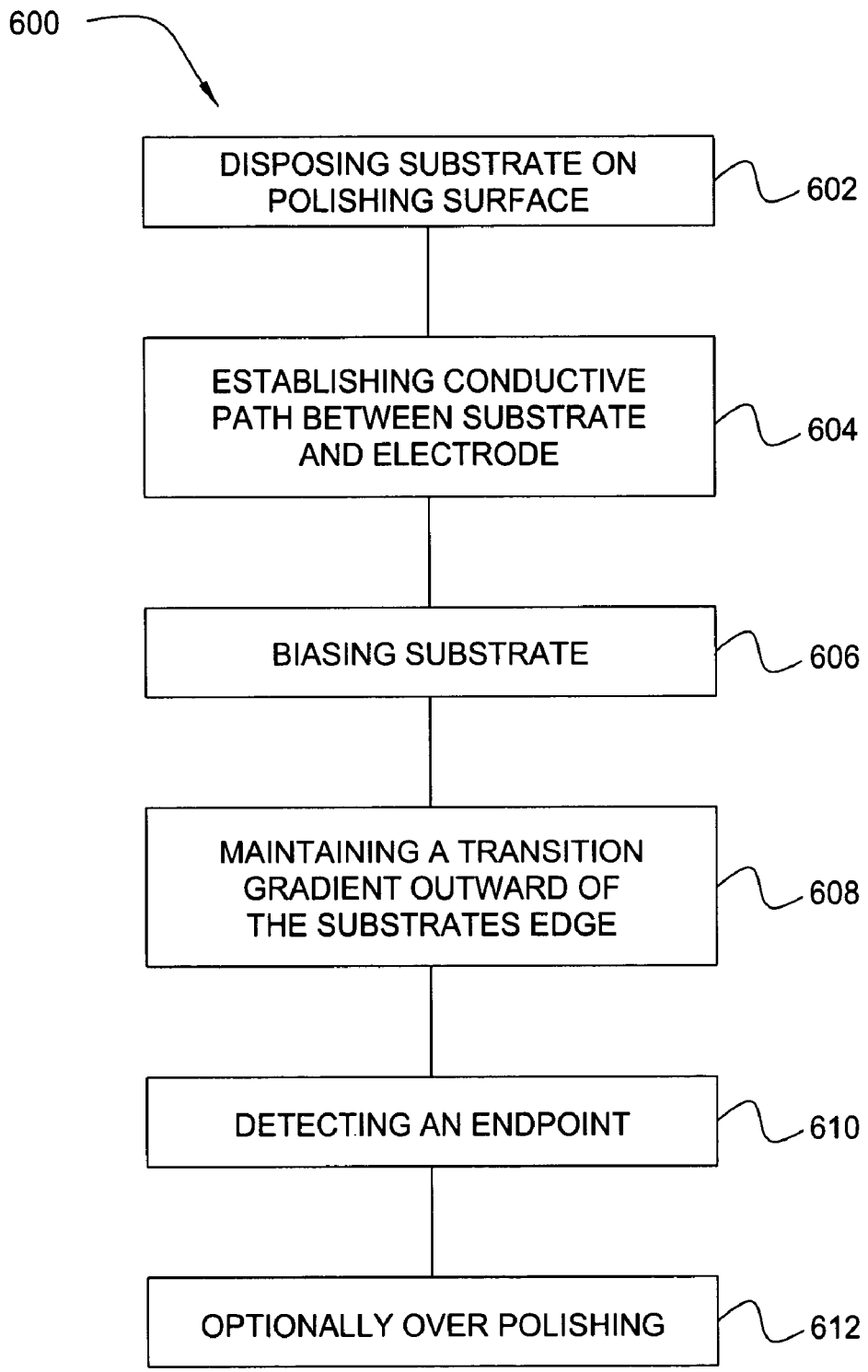
FIG. 6 is one embodiment of a method for electroprocessing substrates.

FIG. 6 is a flow diagram of one embodiment of a method 600 for controlling polishing profile in an Ecmp process. The method 600 begins step 602 by disposing a substrate 120 on a polishing surface 104 in an Ecmp station 100. At step 604, electrolyte is provided between the substrate and an electrode 144 disposed below the polishing surface 144 to establish a conductive path therebetween. As described above, the electrode 144 may include one or more independently biasable electrode segments.

At step 606, an electrical bias is established between the substrate and the electrode 144. In one embodiment, the electrical bias may be independently controlled between the electrode segments such that a local polishing rate is established between different portions of the substrate and the electrode, thereby facilitating removal profile control. Examples of biasing an electrode in an Ecmp station to facilitate polishing control that can be adapted to benefit from the invention are described in U.S. patent application Ser. No. 10/244,688, filed Sep. 16, 2002, U.S. patent application Ser. No. 10/456,851, filed Jun. 6, 2003, U.S. patent application Ser. No. 10/949,160, filed Sep. 24, 2004, and U.S. patent application Ser. No. 10/940,603, filed Sep. 14, 2004, all of which are hereby incorporated by reference in their entireties.

The power source 166 is suitable for providing positively and negatively biasing the electrode segments 210A-F. The power source 166 may controllably provide between −5 to +7 VDC to the electrode 144, contact element 134 and/or ring 126.

In a simplified description of one mode of operation illustrated in FIG. 2A, the voltage of the electrolyte in a contained region 250 disposed between the substrate and the polishing surface is generally held at about −1.5 VDC when the bias applied between the electrode 144 and substrate is about 3.5 VDC. As the electrolyte on the polishing surface 104 in a free region 254 defined outward of the polishing head 122 is at a potential of about −2.5 VDC, a transition gradient is present proximate the substrates edge, shown as a transition region 252. In other words, the transition region 252 has a large voltage gradient where the voltage in the electrolyte increases rapidly from −1.5 to −2.5 VDC over a short span. As the transition gradient in the transition region 252 has voltages much higher than the voltage in the contained region 250, the local polishing rate at the edge of the substrate proximate the transition region 252 has a much faster removal rate compared to the rate across the contained region 250 over the center of the substrate 120. Others believe that this effect is may be caused by the distribution and/or shape of the electric field lines as influenced by the potential profile created by potential difference between the electrode and substrate.

To better control the polishing rate at the transition region 252, the transition gradient is maintained outward of the edge of the substrate 120 at step 608. The transition gradient may be maintained outward of the edge of the substrate by at least two methods. In one embodiment, one or more of the electrode segments proximate and/or outward of the polishing area are biased with a polarity opposite the polarity of the electrode segments within the polishing area. For example, the outermost electrode segment 210F may be positively biased with a voltage less than about zero VDC, and in one embodiment, is biased with about zero to about +5 VDC, and in yet another embodiment, is biased with less than about +2 VDC. The reverse polarity of the outer electrode segment 210F (relative to the inner electrode segments) causes the transition region 252 having the voltage gradient to shift outward as shown in FIG. 2B. As the higher voltages are "confined" to an area outward of the substrate, the electrode segments disposed under the polishing area may more effectively control the polishing profile, thereby reducing and/or substantially eliminating the fast edge polish experienced by conventional polishing routines. In one embodiment, the voltage applied to the electrode segments is reference from the substrate (i.e., the substrate provides a 0 VDC reference).

In another embodiment, step 608 may be practiced by applying a positive bias to a conductive portion of the retaining ring 126. For example, a voltage greater than zero, such as about 1 VDC, may be applied to the retaining ring 126 to move the transition region 252 outward of the polishing area 404, as shown in FIG. 2B. In another embodiment, the voltage applied to the ring 126 is between about zero to about 3 VDC. In yet another embodiment, a reverse polarity may be applied to the outer electrodes (relative the electrode segments under the substrate) while the retaining ring is positively biased.

The method 600 is terminated at step 610 when an endpoint is determined. The endpoint may be determined by polishing time, eddy current sensing, interferometer, optical techniques, voltage, charge or current monitoring, among other suitable endpoint detection techniques. Examples of suitable endpoint techniques that may be adapted to benefit from the invention are described in the previously incorporated U.S. patent application Ser. Nos. 10/244,688, 10/456,851, 10/949,160, and 10/940,603. An optional overpolish step 612 may also be utilized to remove residual conductive material.

Figure 7:
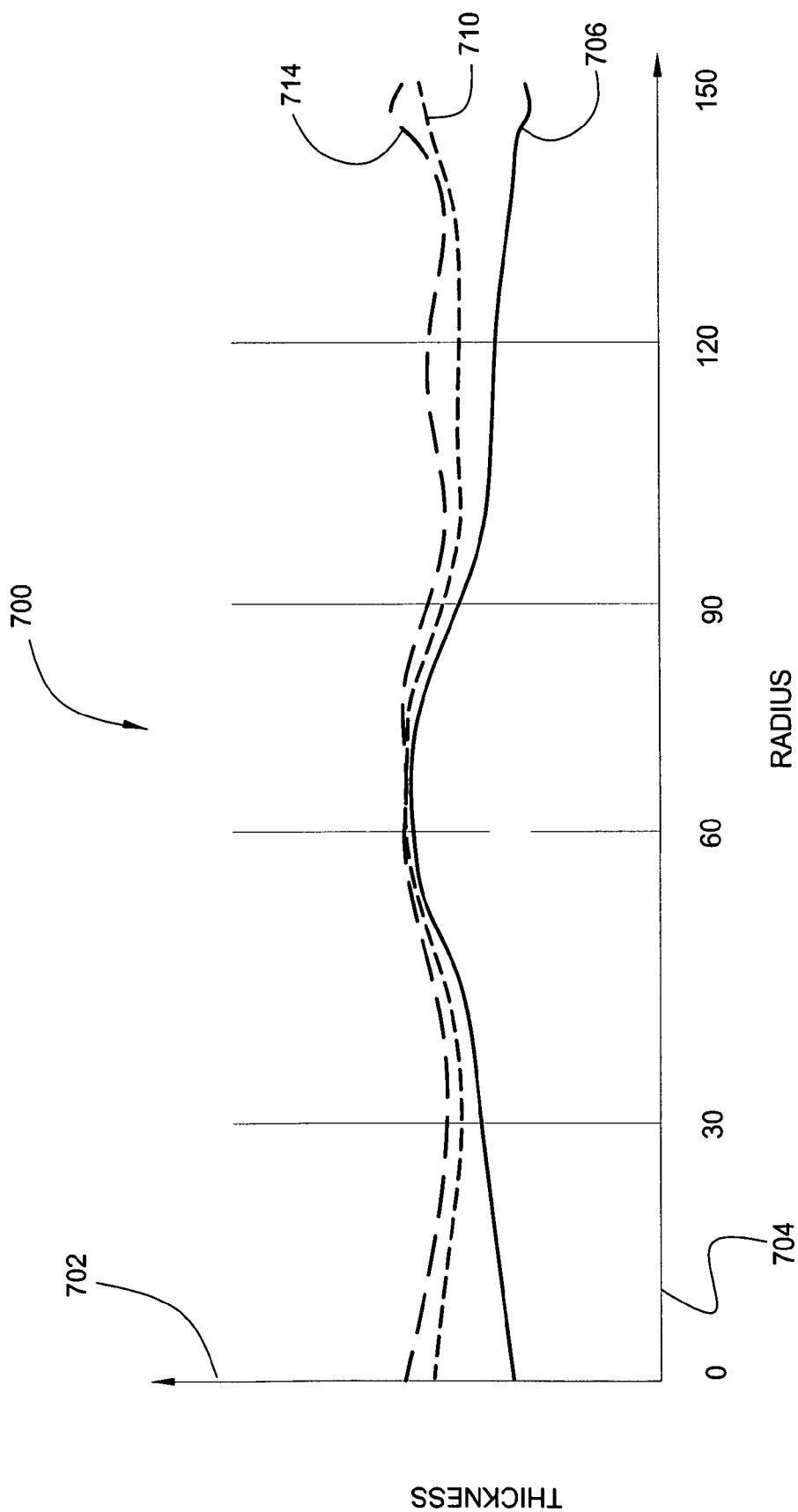
FIG. 7 is a graph illustrating the effect of maintaining a transition voltage gradient outward from the edge of a substrate using the method of FIG. 6.

FIGS. 7-8 illustrate some of the benefits of processing substrates using the method 600. FIG. 7 is a graph 700 depicting plots 706, 710, 714 of thickness profiles across the radius of a substrate processed as described above. Thickness is plotted on I axis 702 while radius across the substrate is plotted on x axis 704. The plot 706 depicts an electropolishing process wherein reverse bias was not applied to the outer electrodes. As depicted in FIG. 7, the reduced thickness near the outer radial regions of a plot 706 is indicative of fast edge polishing. In contrast, the plots 710 and 714 illustrate greater thickness uniformity during the polishing process. Plot 710 represents the thickness profile of a substrate after an electrochemical polishing process, wherein an electrode outside of the polishing area was biased with about negative two volts while the electrodes within the polishing area were positively biased. Plot 714 depicts a thickness profile of a polishing process wherein the electrodes outside the polishing area were negatively biased with a greater voltage as compared to the process represented by plot 710. As illustrated in FIG. 7, the process of plot 714 has a slower edge polished as compared to plot 710, thereby illustrating the effect of negative bias on edge fast polishing. Similar results may be achieved by applying a positive bias to the retaining ring 226. Moreover, a negative bias may be applied to the outer electrodes while applying a positive bias to the retaining ring to further tune the polishing process to control edge fast polishing uniformity.

Control of edge clearance may also be beneficially controlled by negatively biasing the outer electrodes and/or biasing the retaining ring 126. As depicted in FIG. 8, a substrate 800 typically includes a cleared area 812 separating the conductive covered area 814 at the perimeter 802 of the substrate 800. The line 810 depicts the extent of the conductive material covered area 814 prior to processing. During processing, as the conductive material is removed, the diameter of the conductive material area 814 recedes away from the outer diameter 802. For example, in conventional processes which have an edge fast polishing tendency, the edge of the conductive material area 814 may recede an undesirable distance from the perimeter 802 as illustrated by line 804. By applying a negative bias to the outer electrodes and/or applying a positive bias to the retaining ring 126, the edge of the conductive material area 814 may be maintained much closer to its original position at its pre-processed position at 810, as shown by lines 806, 808. The line 806 is representative of the position of the edge of the conductive material covered area 814 utilizing a negative bias of about two volts. The line 808 is representative of the edge of the conductive material covered zone 814 utilizing a negative bias of about four volts. As depicted in FIG. 8, reversing the bias outside the polishing area and/or applying a positive bias to the retaining ring beneficially reduces undesirable growth in etch clearance during processing.

FIG. 9 depicts an alternative embodiment of a polishing pad assembly 900 that may be utilized in the Ecmp station 100 to practice the method 600. The polishing pad assembly 900 generally includes a conductive polishing surface 902, a subpad 904 and an electrode 906. The subpad 904 and the electrode 906 are similar to the subpad 211 and segmented electrode 144 described above.

The conductive polishing surface 902 coupled to a power source 166 is utilized in place of the contact element 134 to bias the substrate 120 relative to the electrode 906 during processing. The conductive polishing surface 902 may be fabricated from a conductive material, such as those described in the various pad embodiments of the previously incorporated U.S. patent applications disclosed above.

In one embodiment, the conductive polishing surface 902 is comprised of a polymeric material having conductive material disposed therein. For example, the conductive polishing surface 902 may include nickel, copper, gold, carbon and/or tin particles disposed in a polymer binder. The polishing surface 902 may include a conductive fabric, such as a copper coat nylon material. The conductive fabric may be covered by a layer of conductive polymer, such as the material described above.

The conductive polishing surface 902 may be embossed or textured. The conductive polishing surface 902 may include one or more islands of non-conductive material, such as a polyurethane strip. The conductive polishing surface 902 may also include abrasives.

The conductive polishing surface 902 includes a plurality of passages 218 to allow an electrolyte, disposed on the conductive polishing surface 902, to establish a conductive path between the upper surface of the conductive polishing surface 902 and the electrode 906. Electrolyte may be provided through the pad assembly 900 through a passage 208 or utilizing an outlet supported over the conductive polishing surface 902 as shown in FIG. 1.

Thus, a method and apparatus have been provided that advantageously facilitates profile control while reducing edge fast polishing effects. Moreover, the invention provides better control of edge exclusion for greater device yield and greater substrate to substrate polishing results.

Elements of the various embodiment described herein are not mutually exclusive, but are contemplated that the elements may be combined to form other embodiments of the invention. While the foregoing is directed to the illustrative embodiment of the present invention, other and further embodiments of the invention may be devised without departing from the basic scope thereof, and the scope thereof is determined by the claims that follow.

What is claimed:

1. A method of electroprocessing a substrate, comprising:
    pressing a surface of the substrate against a polishing pad, the polishing pad comprising at least a partially conductive polishing surface and at least a first electrode and a second electrode residing in a common layer of the polishing pad;
    biasing the first electrode relative the at least partially conductive polishing surface to establish a first electroprocessing zone between the first electrode and the substrate; and
    biasing the second electrode relative the at least partially conductive polishing surface with a polarity opposite the bias applied to the first electrode, the second electrode disposed radially outward of the substrate, wherein the first and second electrodes are on a side of the polishing pad opposite the polishing surface.

2. The method of claim 1, wherein the step of biasing the first electrode further comprises:
    applying a negative voltage to the first electrode.

3. The method of claim 2, wherein the step of biasing the first electrode further comprises:
    applying greater than zero to about seven volts.

4. The method of claim 3, wherein the step of biasing the second electrode further comprises:
    applying less than about two volts to the second electrode.

5. The method of claim 1, wherein the step of biasing the second electrode further comprises:
    applying greater than zero to about five volts to the second electrode.

6. The method of claim 1 further comprising:
    pressing the substrate against the polishing surface of a polishing pad with a force less than about two pounds per square inch.

7. The method of claim 1 further comprising:
    applying, to at least one of plurality of electrodes disposed inward of the second electrode, a negative bias between about zero to about 7 VDC.

8. The method of claim 7 further comprising:
    individually controlling the bias applied to each of the plurality of electrodes.

9. The method of claim 1 further comprising:
    moving the substrate retained by a conductive retaining ring relative to the polishing surface of the processing pad while maintaining contact between the substrate and the processing pad.

10. The method of claim 9 further comprising:
    applying a positive bias to the retaining ring.

11. The method of claim 9, wherein the step of applying a bias to the retaining ring further comprises:
    applying greater than zero to about three volts.

12. The method of claim 11, wherein the step of applying a bias to the retaining ring further comprises:
    applying about one volt to the retaining ring.

13. The method of claim 1 further comprising:
    flowing the electrolyte through the polishing surface pad and into contact with the substrate.

14. The method of claim 1 further comprising:
    contacting the substrate with at least one conductive element coupled to a power source.

15. The method of claim 14, wherein the at least one conductive element further comprises:
    a plurality of independently biasable conductive elements.

16. The method of claim 1, wherein the step of biasing the second electrode further comprises:
    applying power to a conductive portion of a retaining ring of a polishing head.

17. The method of claim 1 further comprising:
    establishing a conductive path through electrolyte disposed between the electrodes and the substrate.

18. The method of claim 17, wherein the step of establishing further comprises:
    flowing electrolyte through the polishing surface to the substrate.

19. The method claim 17, wherein the step of establishing further comprises:
    flowing electrolyte onto the polishing surface and into contact with the electrodes through a plurality of holes formed through the polishing surface.

20. The method of claim 17, wherein the step of biasing the substrate further comprises:

contacting the substrate with a conductive portion of the polishing surface.

21. The method of claim 20, wherein a polishing area defined on the polishing surface is conductive.

22. The method of claim 20 further comprising:
providing relative motion between a non-conductive portion of the polishing surface, wherein the substrate is simultaneously in contact with the non-conductive and conductive portions of the polishing surface.

23. The method of claim 17, wherein the first electrode is disposed outward of a polishing area defined on the polishing surface.

24. The method of claim 17, wherein the step of biasing the electrodes further comprises:
biasing the first electrode with a positive voltage.

25. The method of claim 17, further comprising:
applying a positive voltage to a portion of a polishing head disposed outward of the substrate.

26. The method of claim 1 further comprising:
moving the substrate retained against a portion of the polishing surface to define a polishing region of the polishing surface; wherein the second electrode is disposed at least partially outside of the polishing region.

27. The method of claim 26, wherein the step of biasing the second electrode further comprises:
applying a positive voltage to a portion of a polishing head disposed outward of the substrate.

28. The method of claim 26, wherein the step of biasing the second electrode further comprises:
applying a positive bias less than about two volts to the second electrode.

29. The method of claim 26, wherein the step of biasing the second electrode further comprises:
applying a positive bias between about zero to about four volts to the second electrode.

30. The method of claim 26 further comprising:
pressing the substrate against a polishing pad with a force less than about two pounds per square inch.

31. The method of claim 26 further comprising:
applying, to at least two of a plurality of electrodes disposed inward of the first electrode, a bias between about zero to about negative 7 VDC.

32. The method of claim 31 further comprising:
individually controlling the bias applied to each of the plurality of electrodes.

* * * * *

UNITED STATES PATENT AND TRADEMARK OFFICE
CERTIFICATE OF CORRECTION

PATENT NO. : 7,655,565 B2
APPLICATION NO. : 11/043570
DATED : February 2, 2010
INVENTOR(S) : Manens et al.

It is certified that error appears in the above-identified patent and that said Letters Patent is hereby corrected as shown below:

Column 12, Claim 13, Line 41, delete "pad".

Signed and Sealed this

Eighth Day of June, 2010

David J. Kappos
*Director of the United States Patent and Trademark Office*